(12) United States Patent
Arai et al.

(10) Patent No.: US 7,177,090 B1
(45) Date of Patent: Feb. 13, 2007

(54) TELECENTRIC ZOOM LENS

(75) Inventors: Takeo Arai, Saitama (JP); Kentaro Yano, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 11/197,362

(22) Filed: Aug. 5, 2005

(51) Int. Cl.
*G02B 15/14* (2006.01)

(52) U.S. Cl. ............................. 359/680; 359/689

(58) Field of Classification Search ........ 359/680–682, 359/683, 689, 770, 781
See application file for complete search history.

(56) References Cited

U.S. PATENT DOCUMENTS

| 6,137,638 | A  | * | 10/2000 | Yamagishi et al. | ......... 359/682 |
| 2003/0165019 | A1 |   | 9/2003  | Yamamoto         | ......... 359/683 |
| 2006/0132929 | A1 | * | 6/2006  | Ito              | ......... 359/689 |

FOREIGN PATENT DOCUMENTS

| JP | 10-307332   | 11/1998 |
| JP | 2001-051194 | 2/2001  |
| JP | 2002-107627 | 4/2002  |
| JP | 2003-015038 | 1/2003  |
| JP | 2003-195169 | 7/2003  |

\* cited by examiner

*Primary Examiner*—Timothy Thompson
*Assistant Examiner*—M. Hasan
(74) *Attorney, Agent, or Firm*—Jacobson Holman PLLC

(57) ABSTRACT

The present invention is directed to provide a telecentric zoom lens capable of attaining a small numerical aperture, a wide angle of view, reduced distortion, high resolution, reduced chromatic aberration, small aperture, and yet avoiding a cost increase and also to provide the telecentric zoom lens that shows a unified imaging ability relative to a varied distance to the screen and has a minimum projection distance to the screen got shorter. The telecentric zoom lens is comprised of a first group of lenses negative in power, a second group of lenses positive in power, and a third group of lenses positive in power, and a focal length fw at a wide angle of view can be given in relation with focal lengths f1, f2 and f3 of the first, second and third groups of lenses respectively, as follows:

$2.5 \geq |f1/fw| \geq 1.5$, $4 \geq f2/fw \geq 2.5$, and $13 \geq f3/fw \geq 3$.

9 Claims, 15 Drawing Sheets

MAXIMUM VISUAL FIELD 13.000 mm

MAXIMUM VISUAL FIELD 13.000 mm

MAXIMUM VISUAL FIELD 13.000 mm

MAXIMUM VISUAL FIELD 13.000 mm

MAXIMUM VISUAL FIELD 13.000 mm microns mm

%

MAXIMUM VISUAL FIELD 13.000 mm

MAXIMUM VISUAL FIELD 13.000 mm

MAXIMUM VISUAL FIELD 13.000 mm

MAXIMUM VISUAL FIELD 13.000 mm

MAXIMUM VISUAL FIELD 13.000 mm microns mm

%

TELECENTRIC ZOOM LENS

FIELD OF THE INVENTION

The present invention relates to a telecentric zoom lens, and more particularly, it relates to a telecentric zoom lens suitably used to a projector which is telecentric on the side closer to a display device in such a context that a light flux incident upon the display device is reflected to make a primary beam of the light flux almost in parallel with the optical axis.

BACKGROUND ART

A telecentric projection lens, which is necessary especially for a projector to enhance a reflection efficiency of a display device, is configured to locate its entrance pupil significantly apart from the display device toward a screen for the purpose of enhancement of the reflection efficiency. The display device using such a telecentric zoom lens includes a combination of a liquid crystal device, digital micromirror device (DMD), and a TIR prism, and we recently have found drastic needs of the DMD in the market. In addition, for recent years, commercially available has been a rear projection TV set in which the telecentric zoom lens is incorporated.

Under these circumstances, the requirements of the telecentric zoom lens currently needed in the industry are as follows:

(1) Higher brightness (i.e., smaller numerical aperture). This is useful to project brighter beams on the screen. In order to direct the light flux from the light source as much reduced loss as possible to the screen, the projection lens must be increased in its pupil diameter so as to reduce the numerical aperture.

(2) Wider angle of view. Even in a relatively narrow residential space in Asia and Europe, it is desired that a sufficiently large image should be projected at a reduced distance to the screen.

(3) Reduced distortion. Desirably, a picture projected on the screen must not be distorted, and viewers seeing the distorted picture on the screen would really invoke some prompt emotional response of not feeling good.

(4) High resolution and reduced chromatic aberration. It is significant for either the liquid crystal device or the DMD to make pixel data reproducible with fidelity as complete as possible, and the required resolution is to be a performance of enabling the device to sufficiently resolve the pixels. However, fully resolving the pixels does not necessarily bring about attainments of sufficient resolution, picture quality, and color reproducibility after all due to color drift. Thus, it is necessary to minimize the chromatic aberration by means of low dispersion glass, but still required are additional particular concerns about confirming the correlation of the intended performance in design to the actually eye-inspected picture quality and refining the design in consideration of the predictable cost.

(5) Smaller diameters of lenses. This is especially related to a specification of outer dimensions of a main projector, and the downsizing or portability is an inevitable requirement. The thicknesswise dimension of the projector straightforwardly depends upon a diameter of a projection lens.

(6) Holding down on a cost increase due to featuring the zooming. The zooming function (power varying optics) has been prevailing as being essential as a user friendly feature that enables the operator to vary a projection size more easily. As is often the case, however, the feature of the zooming adds a more complicated mechanical drive system to the projector, and instead, the optical and mechanical designs must be made deliberating on avoiding the cost increase.

Among the telecentric zoom lenses for currently commercially available projectors, none of them meet all the above-mentioned requirements (1) to (6). Some sacrifices the requirements (1), (2) and (5) for the remainings (3) and (4), for example.

Some prior art zoom lens dedicated to the projector has a four-lens-group structure that typically consists of a first group of lenses adjustably moved forward for the focusing, a second group of lenses moved for the power varying, a third group of lenses serving as a compensator, and a fourth group of lenses fixed and stationary (see Patent Document 1 listed below).

Configured in this way, it is hard to unify the imaging ability relative to the varied distance to the screen especially because only the first group of lenses are adjusted for the focusing, and the resultant minimum projection distance to the screen tends to be even longer. In order to make this distance conveniently fall in a close-up range with a certain wide angle of view, an effective aperture of the foremost lens is liable to be greater. A cam driving the third group of lenses often provides a kinematic flex point(s), and this is an issue of machineability of the cam.

Moreover, the aforementioned prior art lens has an aspherical lens of spherical surface complex type which gives not so large an area of the aspherical surface and is insufficient to compensate for the distortion. This is why it is particularly hard to widen the angle of view. If the aspherical lens took a large area of the aspherical surface, its thickness should vary considerably from the center to the periphery, and some design tends to highly strengthen the lens power, which is resultantly prone to cause the lens to greatly alter its performance relative to a temperature variation when the lens is a typical lens of resin.

Furthermore, in the optics where the foremost lens has its foremost surface contoured in aspherical plane, the configuration is effective simply in compensating for the aberration but not advantageous in the user's handling in that he or she should touch the foremost surface or otherwise is likely to get it scratched.

Another prior art embodiment of the projection lens has an arrangement of three groups of lenses G1 to G3. The first group of lenses G1 consists of a first lens L1 positive in refractive power with a conjugate surface oriented to a major conjugate side, a second lens L2 negative in refractive power with a sharp concave surface oriented to a minor conjugate side, and a third lens L3 negative in refractive power with a sharp convex surface oriented to the minor conjugate side. The second group of lenses G2 includes a fourth lens L4 positive in refractive power, and an aperture stop AST is provided in the vicinity of the minor conjugate side and close to a focal point on the major conjugate side for the third group of lenses G3. The third group of lenses G3 consists of a fifth lens L5 negative in refractive power with a concave surface oriented to the minor conjugate side, a sixth lens L6 positive in refractive power with a convex surface oriented to the major conjugate side and joined to the fifth lens L5 thereon, and seventh and eighth lenses L7 and L8 respectively positive in refractive power (see Patent Document 1 listed below).

This projection lens is a monofocal lens and is dedicated to a rear projector, and when it is used in a front projector, a focal length becomes shorter to experience difficulty in focusing by adjusting the optics. The lens dedicated to the rear projector should have the first lens got greater in diameter, and this impedes the downsizing of the projector.

Another prior art embodiments of the projection lens are shown in Patent Documents 2 to 5, and none of them meet all the above-mentioned requirements (1) to (6).

LIST OF THE CITED REFERENCES

Patent Document 1:
Japanese Patent Laid-open No. H10-307332
Patent Document 2:
Japanese Patent Laid-open No. 2003-195169
Patent Document 3:
Japanese Patent Laid-open No. 2003-15038
Patent Document 4:
Japanese Patent Laid-open No. 2002-107627
Patent Document 5:
Japanese Patent Laid-open No. 2001-51194

The present invention is made to overcome the above-mentioned disadvantages of the prior art zoom lens used in a projector, and accordingly, it is an object of the present invention to provide a telecentric zoom lens capable of attaining a sufficient brightness (i.e., a small numerical aperture), a wide angle of view, reduced distortion, high resolution, reduced chromatic aberration, a small aperture, and yet avoiding a cost increase.

It is another object of the present invention to provide a telecentric zoom lens that shows a unified imaging ability relative to a varied distance to the screen and has a minimum projection distance to the screen got shorter.

It is still another object of the present invention to provide a telecentric zoom lens that has an aspherical component lens configured to take a greater area of an aspherical surface so as to sufficiently compensate for the distortion and also configured to be reduced in thickness variation from the center to the periphery and that shows a reduced variation of the performance relative to a temperature variation if the lens is a typical lens of resin.

SUMMARY OF THE INVENTION

A first invention is a telecentric zoom lens comprised of a first group of lenses negative in power, a second group of lenses positive in power, and a third group of lenses positive in power; a focal length fw at a wide angle of view being given in relation with focal lengths f1, f2 and f3 of the first, second and third groups of lenses respectively, as follows:

$$2.5 \geq |f1/fw| \geq 1.5 \tag{1}$$

$$4 \geq f2/fw \geq 2.5 \tag{2}$$

$$13 \geq f3/fw \geq 3 \tag{3}$$

In an aspect of the first invention, at least one lens in the first lens group is an aspherical lens.

The telecentric zoom lens is further characterized as follows:

The first lens group consists of a plurality of component lenses including a first foremost component lens and a sub-group of a second component lens of an aspherical surface and trailing component lenses; and focal lengths of the first and second component lenses, f11 and f12, are given as follows:

$$1.6 \geq f11/f12 \geq 0.5 \tag{4}$$

whereby a variation in an imaging ability relative to a varied distance to the screen can be reduced.

When the value f11/f12 exceeds the upper limit of the formula (4), an effective aperture of the first component lens becomes large, and this contradicts the intended reduction of the aperture. The variation in the imaging ability relative to the varied focal length also becomes greater. When the value exceeds the lower limit of the formula (4), a displacement of the second component lens and the trailing ones in a sub-group 4 of the first lens group 1 becomes greater upon the focusing.

The lens according to the present invention is characterized in that the first and second component lenses in the first lens group 1 vary an interval between them during the focusing without changing the entire axial dimension of the lens system.

In this manner employing the focusing system where the second component lens (aspherical lens) and the trailing ones in the sub-group 4 of the first lens group 1 are moved, a degradation of the imaging ability due to the variation in the distance to the screen, namely, a projection distance, can be reduced in comparison with the focusing system where the entire first lens group 1 are moved for the focusing.

In this aspect, the first invention is characterized in that a focal length fp of the aspherical surface of the aspherical lens can be given by a formula as follows:

$$|fp/fw| \geq 13 \tag{5}$$

The second component lens containing sub-group in the first lens group 1 has an aspherical lens 5 typically made by the injection molding. In order to use a molded lens of resin, a performance variation of the lens relative to a temperature variation must be taken into consideration. When the condition of the molded resin lens does not fall in a range given by the formula (5), the moldability is degraded and a deterioration of the performance relative to the temperature variation gets worse.

In another aspect, the present invention is characterized in that the first lens group consist of three or more negative lenses, and the second lens group consist of three or more positive lenses, and that a dispersion value of at least three of the negative and positive lenses can be given by a formula as follows:

$$\text{Dispersion} \geq 75 \tag{6}$$

When the dispersion value exceeds the lower limit in the formula (6), a chromatic aberration of magnification (transverse chromatic aberration) in the peripheral area of the image plane and longitudinal chromatic aberration (or axial chromatic aberration) are developed more. This greatly reduces the resolution or the performance of the lens (Modulation Transfer Function (MTF) property).

In still another aspect of the invention, the third lens group consist of positive and negative lenses, and the dispersion value of the positive lens can be given by the following formula:

$$\text{Dispersion} \geq 75 \tag{7}$$

When the dispersion value exceeds the lower limit in the formula (7), the chromatic aberration of magnification (transverse chromatic aberration) is developed more. Besides, a glassy material of such a high refractive index as satisfying the formula (7) does not exist, and in order to ensure a sufficient telecentricity of the lens, two pieces of positive and negative lenses must be mated and undergo the compensation for the aspherical aberration caused in the third lens group from a view point closer to the object.

A second invention is a telecentric zoom lens comprised of a first group of lenses negative in power, a second group of lenses positive in power, and a third group of lenses positive in power; the first lens group consisting of a first negative meniscus lens having its convex surface oriented toward the screen, a second aspherical lens small in power, a third negative meniscus lens having its convex surface oriented toward the screen, a fourth lens having its opposite surfaces shaped in concave, and a fifth positive lens having its opposite surfaces shaped in convex in the order of closer-to-the-screen-first; the second lens group consisting of sixth and seventh positive lenses, an eighth negative lens, a ninth positive meniscus lens having its concave surface oriented toward the screen, a tenth negative meniscus lens having its concave surface oriented toward the screen and joined to the ninth lens, an eleventh concave lens, a twelfth lens having its opposite surfaces shaped in convex and joined to the eleventh lens, and a thirteenth lens having its opposite surfaces shaped in convex in the order of closer-to-the-screen-first; and the third lens group consisting of a fourteenth positive lens having its opposite surfaces shaped in convex, and a fifteenth negative lens in the order of closer-to-the-screen-first; and a prism being located behind the third lens group.

In an aspect of the second invention, the first lens group consists of the first component lenses comprising a first negative meniscus lens and the second component lenses comprising the second aspherical lens, the third negative meniscus lens, the fourth lens and the fifth positive lens; and the first and second component lenses in the first lens group vary an interval between them during the focusing without changing the whole axial dimension of the lens system.

In the first invention, the formula (1) is expressed as follows:

$$2.5 \geq |f1/fw| \geq 1.5 \quad (1)$$

where fw is the focal length of the entire zoom lens at the wide angle end (i.e., minimized focal length), f1 is the focal length of the first lens group, f2 is the focal length of the second lens group, and f3 is the focal length of the third lens group. When the value |f1/fw| exceeds the upper limit given in the formula (1), the value f2 becomes greater as the value f1 does. Consequently, the displacement of each of the first and second lens groups 1 and 2 gets greater, and this brings about an increase in the total dimension of the optics and in an aperture of the foremost lens. When the value exceeds the lower limit in the formula (1), the focal length of the first lens group 1 becomes shorter, and various aberrations, and especially deviation of the image plane in the peripheral area (curvature of field) and chromatic aberration of magnification, get worse.

When the requirements given by the following formula (2) are not satisfied, $$4 \geq f2/fw \geq 2.5 \quad (2)$$

increased is the displacement of the second lens group 2 which dominates an adjustment of the power of the lens, and this is not preferable for the mechanical structure. Even worse, the total length of the lens is increased. When the value exceeds the lower limit given in the formula (2), it is hard to compensate for spherical and comatic aberrations.

When the value f3/fw exceeds the upper limit as given in the following formula (3), $$13 \geq f3/fw \geq 3 \quad (3)$$

increased are a distance from the third lens group 3 to the entrance pupil and a backfocus, and the total length of the lens is as well, which resultantly impedes the downsizing. When the value exceeds the lower limit given in the formula (3), it is hard to ensure the required backfocus. The occurrence of the spherical aberration in the third lens group 3 impairs the telecentricity of the lens and simultaneously raises the power of the positive lens, which is prone to results in the chromatic aberration of magnification being developed in the peripheral area.

BEST MODE OF THE INVENTION

An exemplary telecentric zoom lens dedicated to a projection optical device according to the present invention will now be described in conjunction with accompanying graphs and drawings.

Embodiment 1

Figure 1:
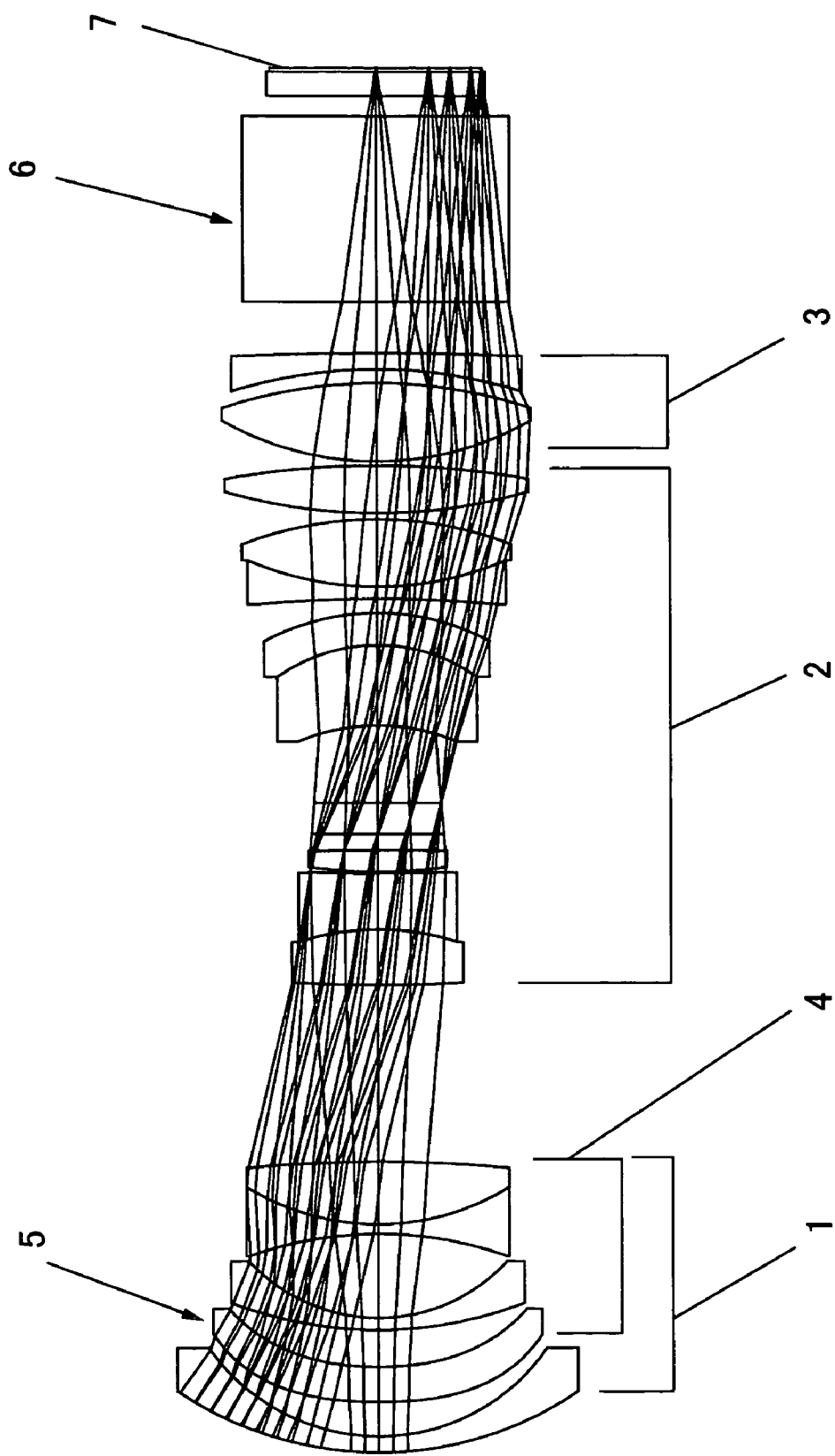
FIG. 1 depicts an optical structure of a first preferred embodiment of a telecentric zoom lens according to the present invention.

As shown in FIG. 1, a first preferred embodiment of a telecentric zoom lens is comprised of first to third groups of lenses, 1 to 3, and a prism 6, which are used in combination with a display device 7. A reference numeral 4 denotes a sub-group of lenses including a second foremost lens and trailing ones in the first lens group 1. Reference numeral 5 denotes an aspherical lens while numeral 6 designates a prism.

An equation expressing a shape of the aspherical surface can be given by a formula (5) as follows:

$$X(H) = (H^2/R)/\{1+[1-(1+\epsilon)\cdot(H^2/R^2)]^{1/2}\} + A4H^4 + A6H^6 + A8H^8 + A10H^{10} \quad (5)$$

where H is a height orthogonal to the optical axis, X(H) is a displacement of the optics from the original point of the apex of the lens under the condition of the height H, R is a paraxial radius of curvature, $\epsilon$ is a conical coefficient, and An is an aspherizing ratio.

Herein, the value of the term in each of the formulae (1) to (5) is given as follows:

|f1/fw| in the formula (1) is 2.40,
f2/fw in the formula (2) is 3.11,
f3/fw in the formula (3) is 5.70,
f11/f12 in the formula (4) is 0.70, and
|fp/fw| in the formula (5) is 15.4.

| Surface # | Curvature | Lens Distance/Thickness | Refractive Index/Dispersion |
|---|---|---|---|
| Object | ∞ | 2000.000 | |
| 1 | 43.686 | 2.000 | 1.85, 23.8 |
| 2 | 25.107 | 4.257 | |
| 3 (Aspherical) | 58.261 | 4.367 | 1.52, 56.3 |
| 4 (Aspherical) | 40.117 | 4.588 | |
| 5 | 49.799 | 1.500 | 1.50, 81.6 |
| 6 | 21.341 | 10.440 | |
| 7 | −46.624 | 1.200 | 1.50, 81.6 |
| 8 | 30.361 | 7.795 | 1.83, 37.3 |
| 9 | −167.448 | 21.988 | |
| 10 | 161.648 | 6.930 | 1.83, 37.3 |
| 11 | −31.569 | 7.000 | 1.81, 25.5 |
| 12 | 387.143 | 0.100 | |
| Diaphragm | ∞ | 0.100 | |
| 14 | 60.806 | 2.659 | 1.81, 25.5 |
| 15 | −399.188 | 2.009 | |
| 16 | ∞ | 3.918 | |
| 17 | ∞ | 9.613 | |
| 18 | −24.851 | 10.000 | 1.49, 70.4 |
| 19 | −20.942 | 4.000 | 1.69, 31.2 |
| 20 | −29.002 | 1.756 | |
| 21 | −158.501 | 1.500 | 1.83, 37.3 |
| 22 | 39.768 | 8.388 | 1.50, 81.6 |
| 23 | −45.394 | 0.761 | |
| 24 | 66.461 | 5.928 | 1.50, 81.6 |
| 25 | −103.229 | 0.500 | |
| 26 | 37.979 | 9.719 | 1.50, 81.6 |
| 27 | −59.075 | 1.712 | |
| 28 | −58.959 | 2.000 | 1.83, 37.3 |
| 29 | −405.927 | 6.371 | |

<Aspherizing Ratio>

The 3rd Surface:

$\epsilon$ = 5.232533
A4 = 3.069305 × 10$^{-05}$
A6 = −5.91664 × 10$^{-08}$
A8 = 1.162270 × 10$^{-10}$
A10 = −4.82654 × 10$^{-14}$
A12 = 0.000000

The 4th Surface:

$\epsilon$ = 0.683464
A4 = 3.600922 × 10$^{-05}$
A6 = −1.08050 × 10$^{-08}$
A8 = 3.100452 × 10$^{-10}$
A10 = −3.00145 × 10$^{-13}$
A12 = 0.000000

Figure 6:
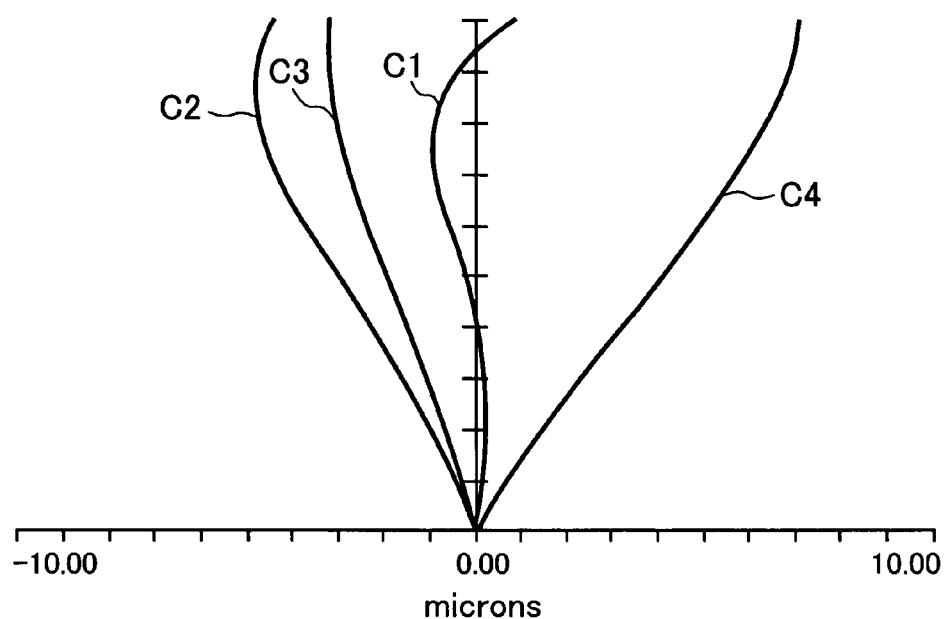
FIG. 6 illustrates transverse chromatic aberration at the telephoto end of the first embodiment of the telecentric zoom lens.
Figure 7:
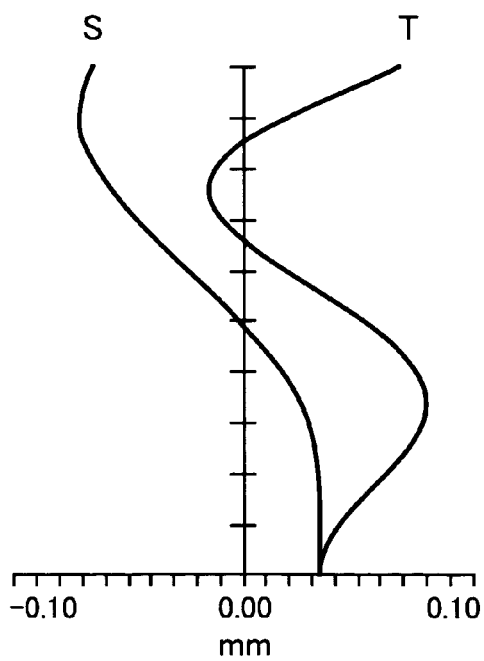
FIG. 7 illustrates curvature of field at the telephoto end of the first embodiment of the telecentric zoom lens.
Figure 8:
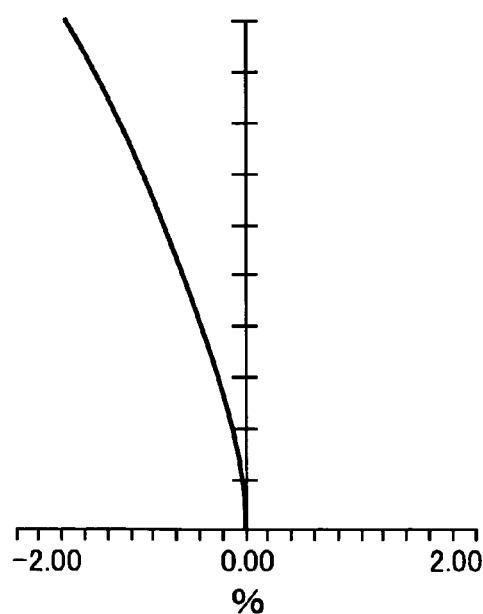
FIG. 8 illustrates distortion aberration at the telephoto end of the first embodiment of the telecentric zoom lens.

FIG. 6 illustrates the traverse chromatic aberration of the first embodiment of the telecentric zoom lens at its telephoto end for various wavelengths 435.83 nm, 486.13 nm, 546.07 nm, and 656.27 nm in comparison with the reference wavelength 587.56 nm, as respectively designated by C1, C2, C3 and C4. FIG. 7 depicts the field curvature for the wavelength of 546 nm. FIG. 8 depicts the distortion aberration for the wavelength of 546 nm.

Figure 9:
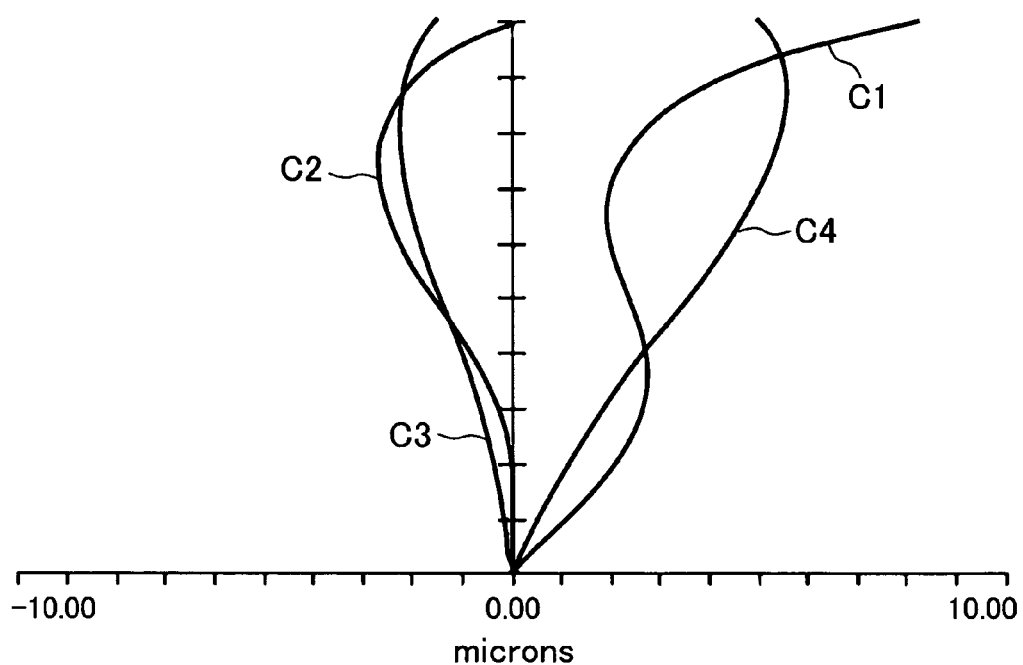
FIG. 9 illustrates the transverse chromatic aberration at the wide angle end of the first embodiment of the telecentric zoom lens.
Figure 10:
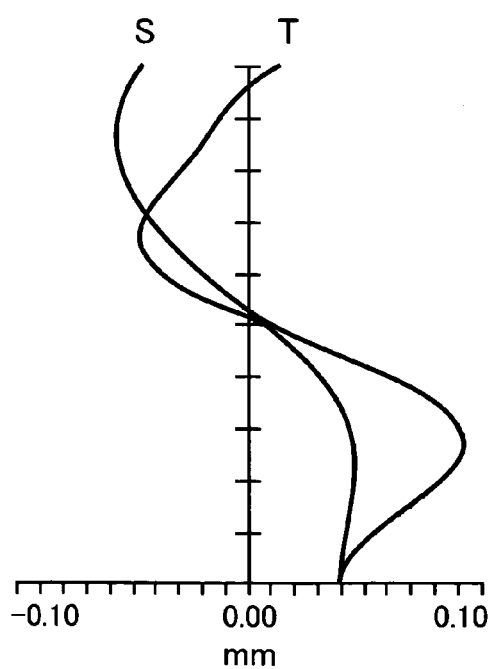
FIG. 10 illustrates the field curvature at the wide angle end of the first embodiment of the telecentric zoom lens.
Figure 11:
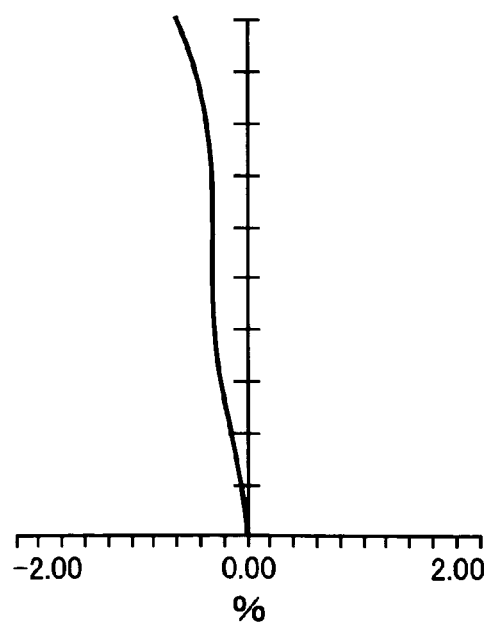
FIG. 11 illustrates the distortion aberration at the wide angle end of the first embodiment of the telecentric zoom lens.

FIG. 9 illustrates the traverse chromatic aberration of the first embodiment of the telecentric zoom lens at its wide angle end for various wavelengths 435.83 nm, 486.13 nm, 546.07 nm, and 656.27 nm in comparison with the reference wavelength 587.56 nm, as respectively designated by C1, C2, C3 and C4. FIG. 10 depicts the field curvature for the wavelength of 546 nm. FIG. 11 depicts the distortion aberration for the wavelength of 546 nm.

Embodiment 2

Figure 2:
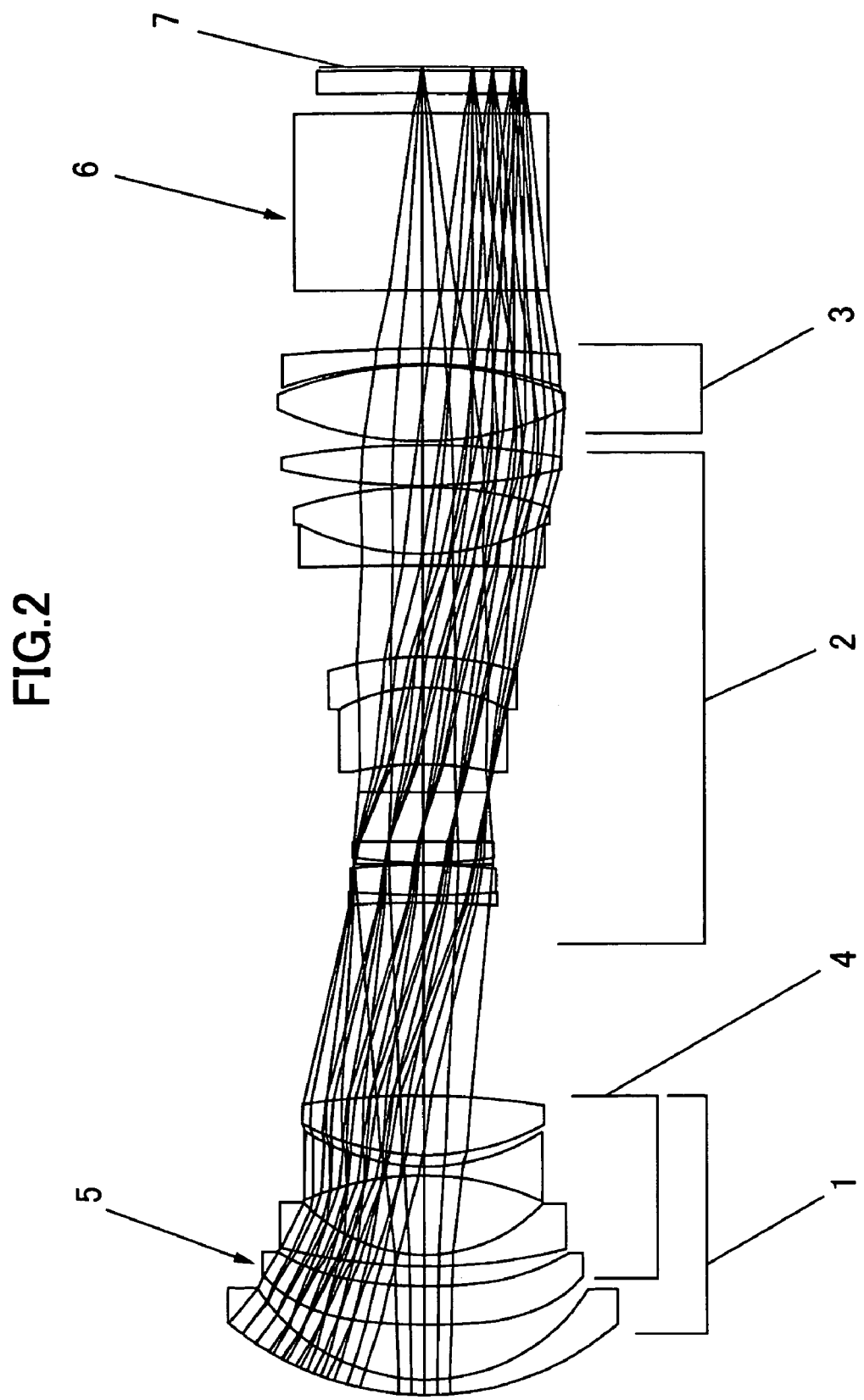
FIG. 2 depicts an optical structure of a second preferred embodiment of the telecentric zoom lens according to the present invention.

As shown in FIG. 2, a second preferred embodiment of the telecentric zoom lens is comprised of first to third groups of lenses, 1 to 3, and a prism 6, which are used in combination with a display panel 7.

Herein, the value of the term in each of the formulae (1) to (5) is given as follows:

|f1/fw| in the formula (1) is 2.22,
f2/fw in the formula (2) is 3.22,
f3/fw in the formula (3) is 5.62,
f11/f12 in the formula (4) is 1.40, and
|fp/fw| in the formula (5) is 30.8.

| Surface # | Curvature | Lens Distance/Thickness | Refractive Index/Dispersion |
|---|---|---|---|
| Object | ∞ | 2000.000 | |
| 1 | 38.252 | 2.000 | 1.85, 23.8 |
| 2 | 24.973 | 7.161 | |
| 3 (Aspherical) | 133.426 | 5.034 | 1.52, 56.3 |
| 4 (Aspherical) | 87.421 | 2.569 | |
| 5 | 73.510 | 1.500 | 1.50, 81.6 |
| 6 | 20.841 | 10.327 | |
| 7 | −36.827 | 1.200 | 1.50, 81.6 |
| 8 | 27.739 | 1.500 | |
| 9 | 32.058 | 7.732 | 1.74, 44.9 |
| 10 | −96.939 | 25.142 | |
| 11 | −148.290 | 1.000 | 1.81, 25.5 |
| 12 | 108.517 | 4.000 | 1.77, 49.6 |
| 13 | −84.231 | 0.000 | |
| Diaphragm | ∞ | 0.200 | |
| 15 | 56.686 | 2.769 | 1.81, 25.5 |
| 16 | −642.278 | 0.100 | |
| 17 | ∞ | 6.385 | |
| 18 | ∞ | 3.632 | |
| 19 | −40.497 | 10.000 | 1.49, 70.4 |
| 20 | −21.738 | 4.000 | 1.65, 33.8 |
| 21 | −40.096 | 11.909 | |
| 22 | −417.047 | 1.500 | 1.83, 37.3 |
| 23 | 34.163 | 8.681 | 1.50, 81.6 |
| 24 | −51.225 | 0.200 | |
| 25 | 78.077 | 5.275 | 1.50, 81.6 |
| 26 | −99.030 | 0.500 | |
| 27 | 42.466 | 9.799 | 1.50, 81.6 |
| 28 | −47.728 | 0.200 | |
| 29 | −54.725 | 2.000 | 1.83, 37.3 |
| 30 | −207.883 | 7.599 | |

<Aspherizing Ratio>

The 3rd Surface:

$\epsilon$ = 14.840770
A4 = $3.494253 \times 10^{-05}$
A6 = $-5.944449 \times 10^{-08}$
A8 = $1.037202 \times 10^{-10}$
A10 = $-3.56696 \times 10^{-14}$
A12 = 0.000000

The 4th Surface:

$\epsilon$ = 2.850162
A4 = $3.694410 \times 10^{-05}$
A6 = $-1.11573 \times 10^{-08}$
A8 = $2.671845 \times 10^{-10}$
A10 = $-2.79319 \times 10^{-13}$
A12 = 0.000000

Figure 12:
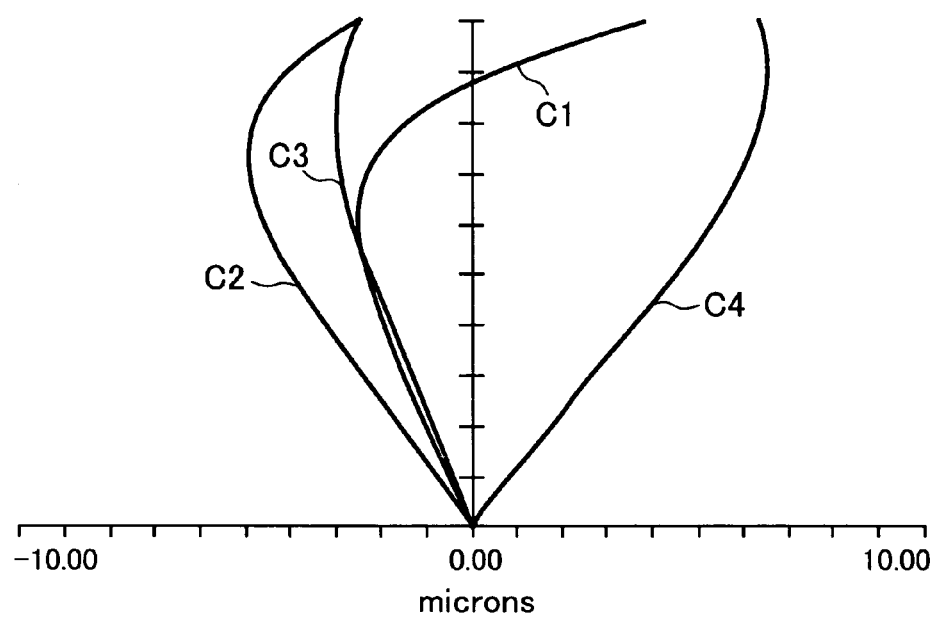
FIG. 12 illustrates the transverse chromatic aberration at the telephoto end of the second embodiment of the telecentric zoom lens.
Figure 13:
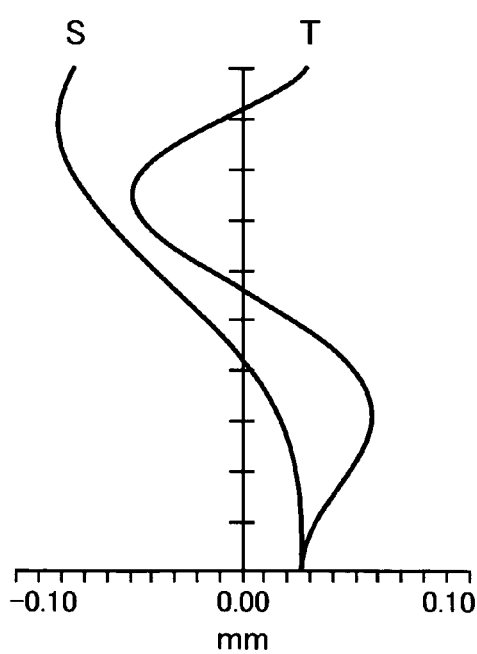
FIG. 13 illustrates the field curvature at the telephoto end of the second embodiment of the telecentric zoom lens.
Figure 14:
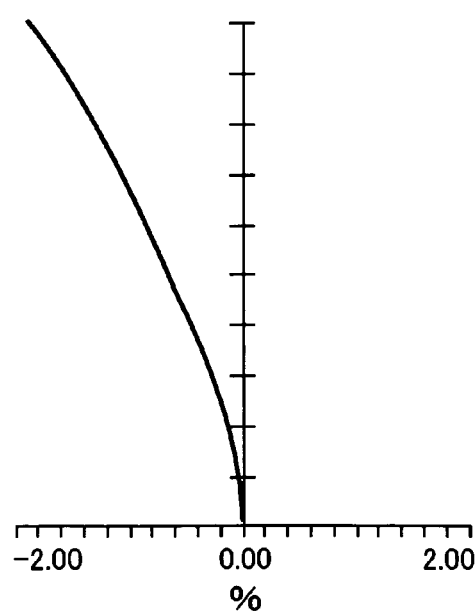
FIG. 14 illustrates the distortion aberration at the telephoto end of the second embodiment of the telecentric zoom lens.

FIG. 12 illustrates the traverse chromatic aberration of the second embodiment of the telecentric zoom lens at its telephoto end for various wavelengths 435.83 nm, 486.13 nm, 546.07 nm, and 656.27 nm in comparison with the reference wavelength 587.56 nm, as respectively designated by C1, C2, C3 and C4. FIG. 13 depicts the field curvature for the wavelength of 546 nm. FIG. 14 depicts the distortion aberration for the wavelength of 546 nm.

Figure 15:
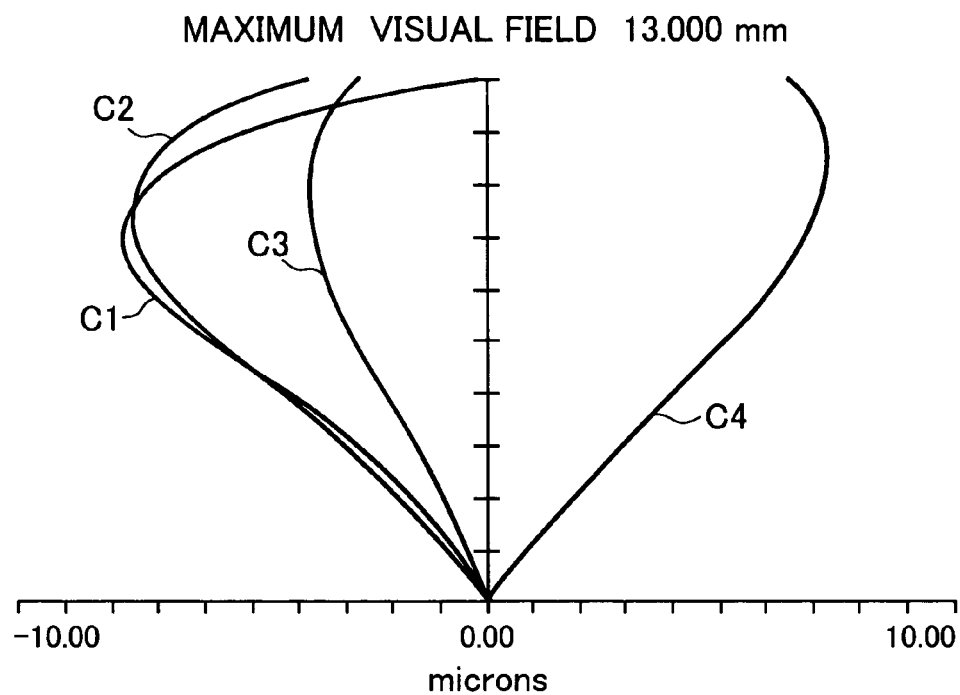
FIG. 15 illustrates the transverse chromatic aberration at the wide angle end of the second embodiment of the telecentric zoom lens.
Figure 16:
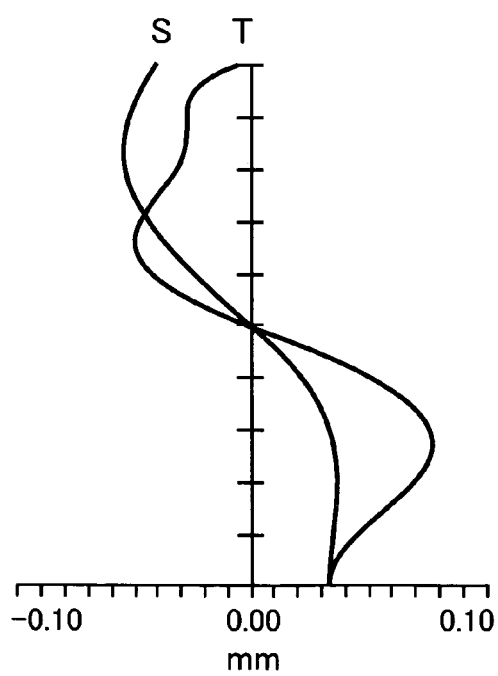
FIG. 16 illustrates the field curvature at the wide angle end of the second embodiment of the telecentric zoom lens.
Figure 17:
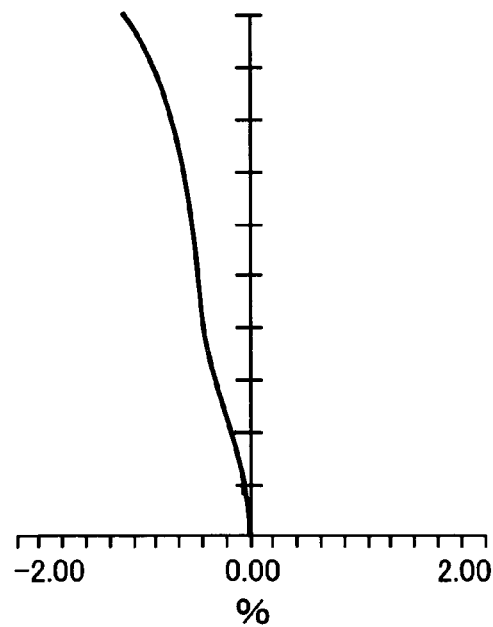
FIG. 17 illustrates the distortion aberration at the wide angle end of the second embodiment of the telecentric zoom lens.

FIG. 15 illustrates the traverse chromatic aberration of the second embodiment of the telecentric zoom lens at its wide angle end for various wavelengths 435.83 nm, 486.13 nm, 546.07 nm, and 656.27 nm in comparison with the reference wavelength 587.56 nm, as respectively designated by C1, C2, C3 and C4. FIG. 16 depicts the field curvature for the wavelength of 546 nm. FIG. 17 depicts the distortion aberration for the wavelength of 546 nm.

Embodiment 3

Figure 3:
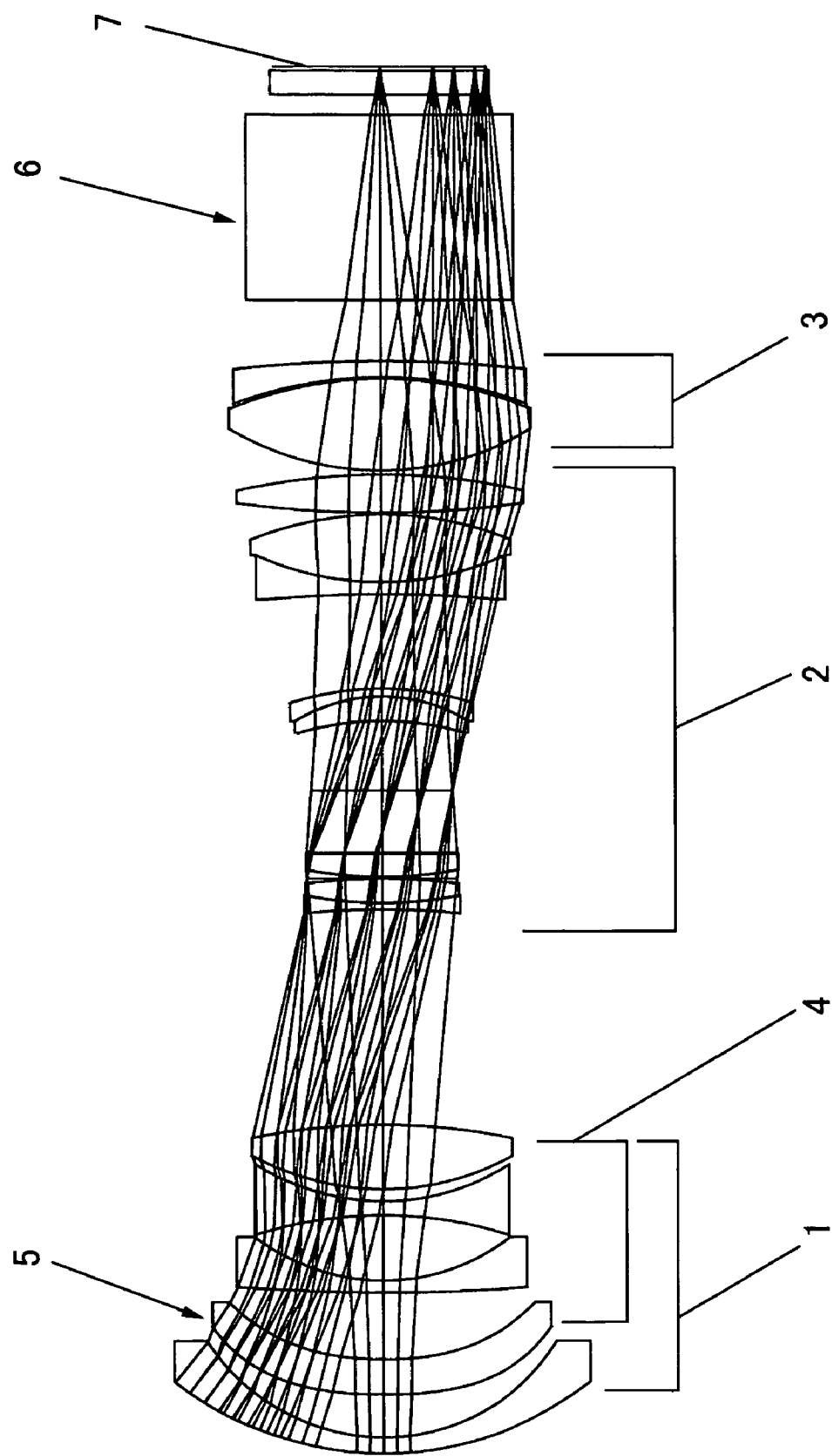
FIG. 3 depicts an optical structure of a third preferred embodiment of the telecentric zoom lens according to the present invention.

As shown in FIG. 3, a third preferred embodiment of the telecentric zoom lens is comprised of first to third groups of lenses, 1 to 3, and a prism 6, which are used in combination with a display panel 7.

Herein, the value of the term in each of the formulae (1) to (5) is given as follows:

|f1/fw| in the formula (1) is 2.37,
f2/fw in the formula (2) is 3.60,
f3/fw in the formula (3) is 4.67,
f11/f12 in the formula (4) is 1.06, and
|fp/fw| in the formula (5) is 15.5.

| Surface # | Curvature | Lens Distance/Thickness | Refractive Index/Dispersion |
|---|---|---|---|
| Object | ∞ | 2000.000 | |
| 1 | 41.028 | 2.000 | 1.85, 23.8 |
| 2 | 25.193 | 5.337 | |
| 3 (Aspherical) | 72.672 | 4.377 | 1.52, 56.3 |
| 4 (Aspherical) | 45.861 | 8.289 | |
| 5 | 232.793 | 1.500 | 1.50, 81.6 |
| 6 | 25.302 | 8.114 | |
| 7 | −50.898 | 1.761 | 1.49, 70.4 |
| 8 | 28.603 | 1.500 | |
| 9 | 32.652 | 8.000 | 1.74, 40.2 |
| 10 | −78.521 | 26.824 | |
| 11 | −95.272 | 0.800 | 1.85, 23.8 |
| 12 | 47.243 | 3.017 | 1.75, 35.3 |
| 13 | −77.201 | 0.000 | |
| Diaphragm | ∞ | 0.200 | |
| 15 | 47.574 | 2.924 | 1.85, 23.8 |
| 16 | −34958.473 | 0.116 | |
| 17 | ∞ | 7.759 | |
| 18 | ∞ | 8.636 | |
| 19 | −36.056 | 3.033 | 1.49, 70.4 |
| 20 | −20.031 | 1.000 | 1.64, 34.6 |
| 21 | −36.064 | 11.712 | |
| 22 | −158.349 | 1.500 | 1.83, 37.3 |
| 23 | 36.296 | 8.421 | 1.50, 81.6 |
| 24 | −42.017 | 0.200 | |
| 25 | 128.730 | 4.746 | 1.50, 81.6 |
| 26 | −78.411 | 0.500 | |
| 27 | 35.452 | 11.407 | 1.50, 81.6 |
| 28 | −47.179 | 0.200 | |
| 29 | −49.948 | 2.000 | 1.83, 37.3 |
| 30 | −157.012 | 7.582 | |

<Aspherizing Ratio>

The 3rd Surface:

$\epsilon$ = 8.641164
A4 = $3.495292 \times 10^{-05}$
A6 = $-6.40052 \times 10^{-08}$
A8 = $1.063518 \times 10^{-10}$
A10 = $-4.88585 \times 10^{-14}$
A12 = 0.000000

The 4th Surface:

$\epsilon$ = 2.360583
A4 = $3.954071 \times 10^{-05}$
A6 = $-1.14532 \times 10^{-08}$
A8 = $2.604083 \times 10^{-10}$

| | |
|---|---|
| A10 = | $-2.70557 \times 10^{-13}$ |
| A12 = | 0.000000 |

Figure 18:
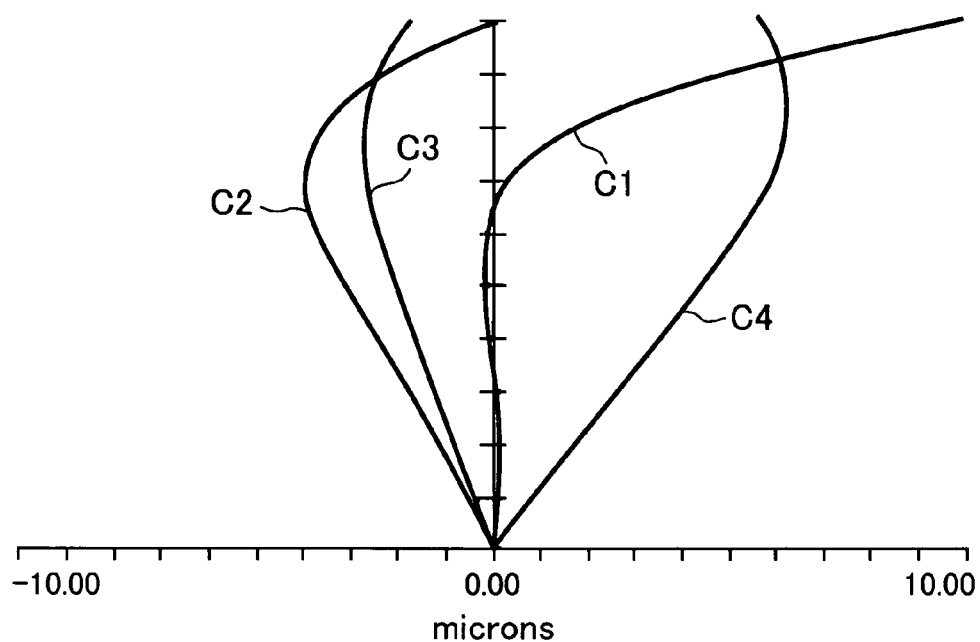
FIG. 18 illustrates the transverse chromatic aberration at the telephoto end of the third embodiment of the telecentric zoom lens.
Figure 19:
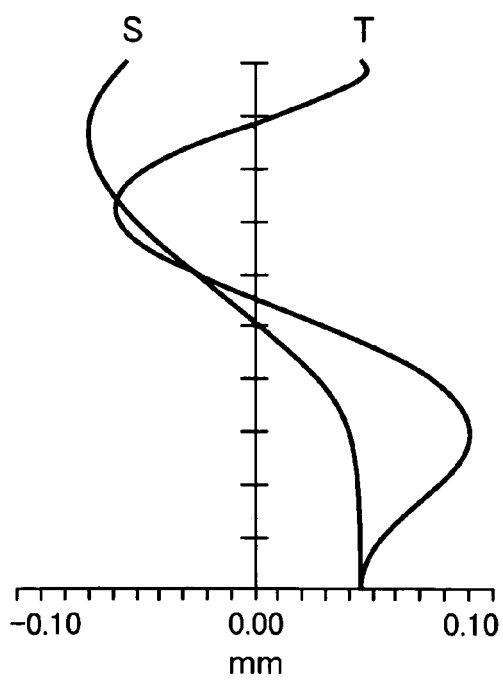
FIG. 19 illustrates the field curvature at the telephoto end of the third embodiment of the telecentric zoom lens.
Figure 20:
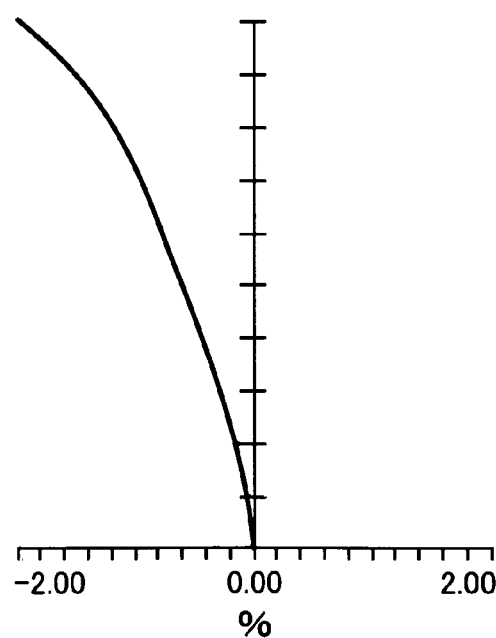
FIG. 20 illustrates the distortion aberration at the telephoto end of the third embodiment of the telecentric zoom lens.

FIG. 18 illustrates the traverse chromatic aberration of the third embodiment of the telecentric zoom lens at its telephoto end for various wavelengths 435.83 nm, 486.13 nm, 546.07 nm, and 656.27 nm in comparison with the reference wavelength 587.56 nm, as respectively designated by C1, C2, C3 and C4. FIG. 19 depicts the field curvature for the wavelength of 546 nm. FIG. 20 depicts the distortion aberration for the wavelength of 546 nm.

Figure 21:
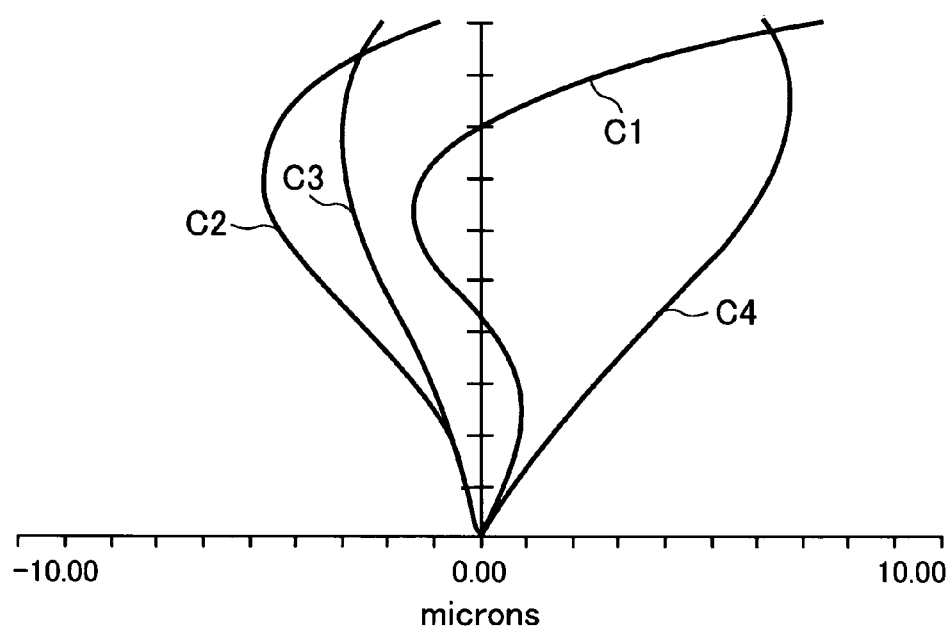
FIG. 21 illustrates the transverse chromatic aberration at the wide angle end of the third embodiment of the telecentric zoom lens.
Figure 22:
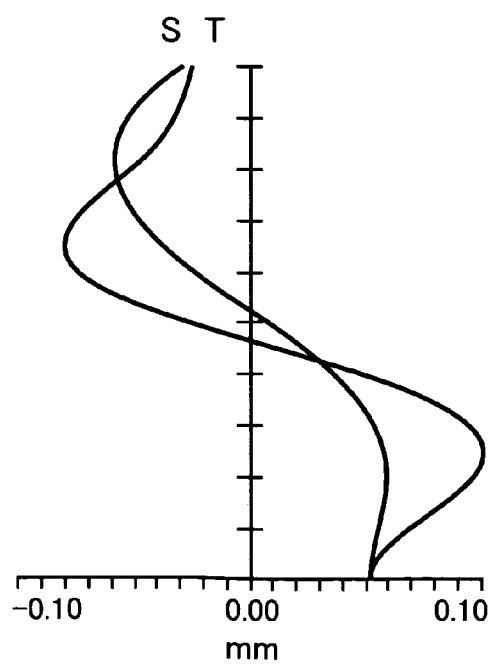
FIG. 22 illustrates the field curvature at the wide angle end of the third embodiment of the telecentric zoom lens.
Figure 23:
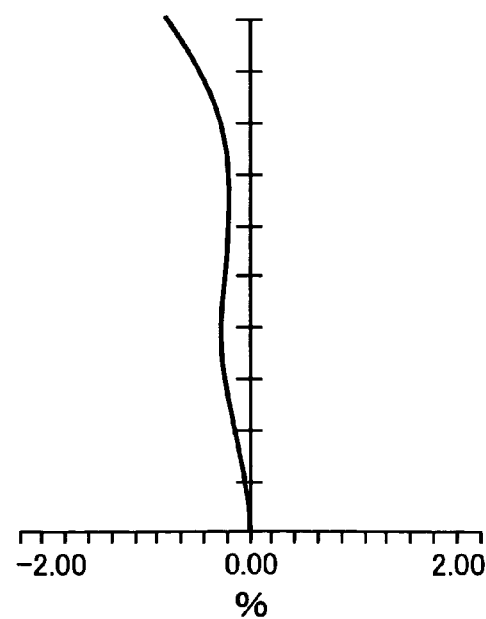
FIG. 23 illustrates the distortion aberration at the wide angle end of the third embodiment of the telecentric zoom lens.

FIG. 21 illustrates the traverse chromatic aberration of the third embodiment of the telecentric zoom lens at its wide angle end for various wavelengths 435.83 nm, 486.13 nm, 546.07 nm, and 656.27 nm in comparison with the reference wavelength 587.56 nm, as respectively designated by C1, C2, C3 and C4. FIG. 22 depicts the field curvature for the wavelength of 546 nm. FIG. 23 depicts the distortion aberration for the wavelength of 546 nm.

Embodiment 4

Figure 4:
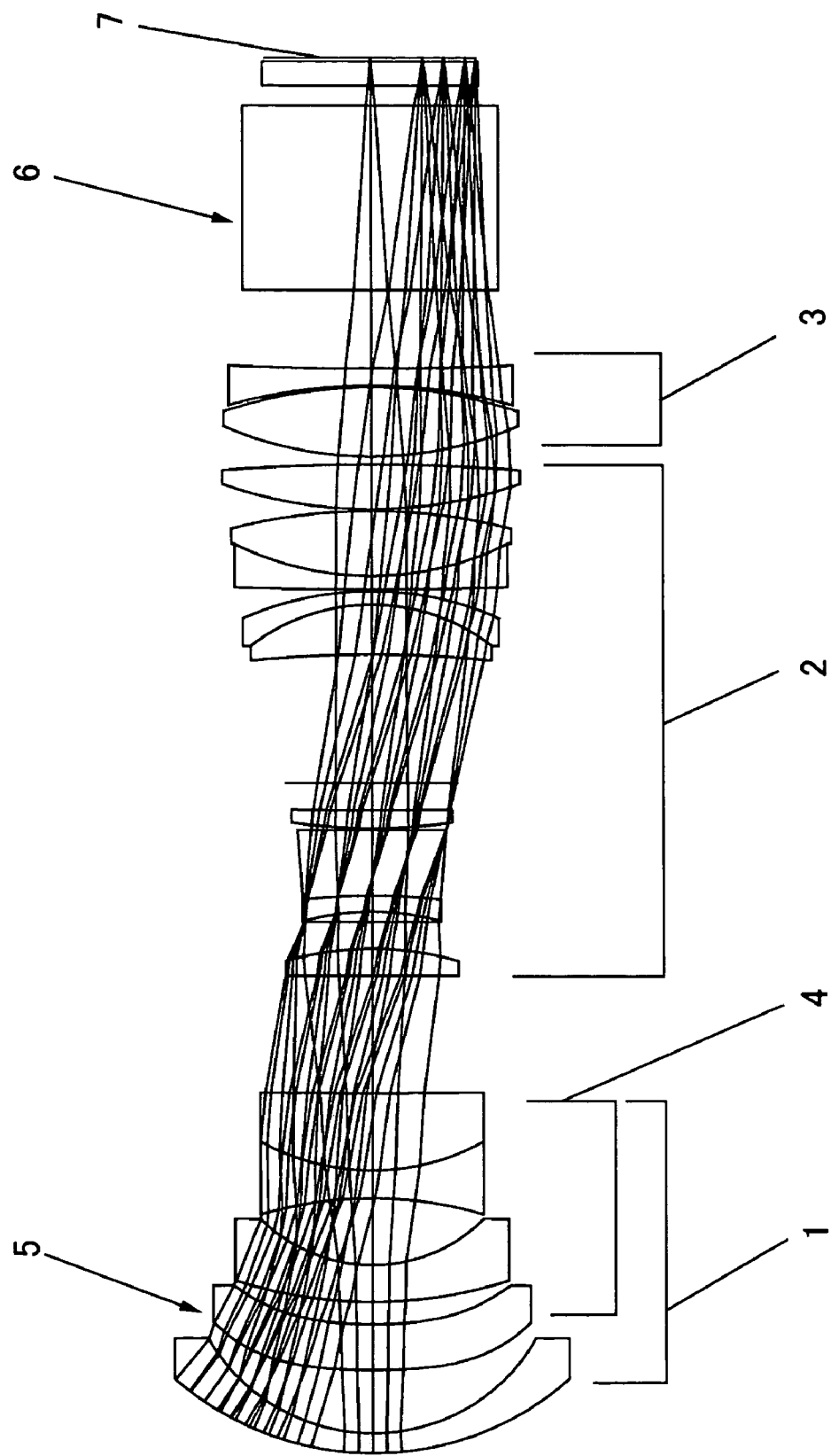
FIG. 4 depicts an optical structure of a fourth preferred embodiment of the telecentric zoom lens according to the present invention.

As shown in FIG. 4, a fourth preferred embodiment of the telecentric zoom lens is comprised of first to third groups of lenses, 1 to 3, and a prism 6, which are used in combination with a display panel 7.

Herein, the value of the term in each of the formulae (1) to (5) is given as follows:

|f1/fw| in the formula (1) is 1.70,
f2/fw in the formula (2) is 2.73,
f3/fw in the formula (3) is 10.92,
f11/f12 in the formula (4) is 1.43, and
|fp/fw| in the formula (5) is 14.4.

| Surface #<br>Object | Curvature<br>∞ | Lens Distance/Thickness<br>1900.000 | Refractive Index/<br>Dispersion |
|---|---|---|---|
| 1 | 36.423 | 2.500 | 1.85, 23.8 |
| 2 | 23.082 | 7.909 | |
| 3 (Aspherical) | 96.399 | 5.700 | 1.52, 56.3 |
| 4 (Aspherical) | 54.761 | 2.805 | |
| 5 | 54.191 | 4.602 | 1.50, 81.6 |
| 6 | 19.171 | 8.368 | |
| 7 | −48.052 | 3.500 | 1.50, 81.6 |
| 8 | 27.800 | 9.687 | 1.83, 37.3 |
| 9 | 1735.661 | 14.732 | |
| 10 | −6784.172 | 3.384 | 1.73, 54.7 |
| 11 | −36.831 | 3.351 | |
| Diaphragm | ∞ | 1.300 | |
| 13 | −29.574 | 2.000 | 1.72, 29.5 |
| 14 | −72.860 | 8.250 | |
| 15 | ∞ | 0.200 | |
| 16 | 68.569 | 2.264 | 1.81, 25.5 |
| 17 | 487.111 | 3.402 | |
| 18 | ∞ | 16.116 | |
| 19 | −144.795 | 6.229 | 1.50, 81.6 |
| 20 | −23.906 | 1.700 | 1.79, 43.9 |
| 21 | −38.044 | 0.200 | |
| 22 | 538.268 | 1.700 | 1.83, 37.3 |
| 23 | 37.367 | 8.135 | 1.50, 81.6 |
| 24 | −68.024 | 0.200 | |
| 25 | 54.898 | 5.590 | 1.50, 81.6 |
| 26 | −232.729 | 1.000 | |
| 27 | 45.547 | 8.678 | 1.50, 81.6 |
| 28 | −55.090 | 0.200 | |
| 29 | −62.637 | 2.134 | 1.83, 37.3 |
| 30 | 454.545 | 9.781 | |

<Aspherizing Ratio>

The 3rd Surface:

| | |
|---|---|
| ϵ = | 5.127448 |
| A4 = | $3.394371 \times 10^{-05}$ |
| A6 = | $-4.7897 \times 10^{-08}$ |
| A8 = | $9.022328 \times 10^{-10}$ |
| A10 = | $-5.83158 \times 10^{-14}$ |
| A12 = | 0.000000 |

The 4th Surface:

| | |
|---|---|
| ϵ = | 2.456869 |
| A4 = | $3.416578 \times 10^{-05}$ |
| A6 = | $-6.30438 \times 10^{-08}$ |
| A8 = | $1718480 \times 10^{-10}$ |
| A10 = | $-2.89477 \times 10^{-13}$ |
| A12 = | 0.000000 |

Figure 24:
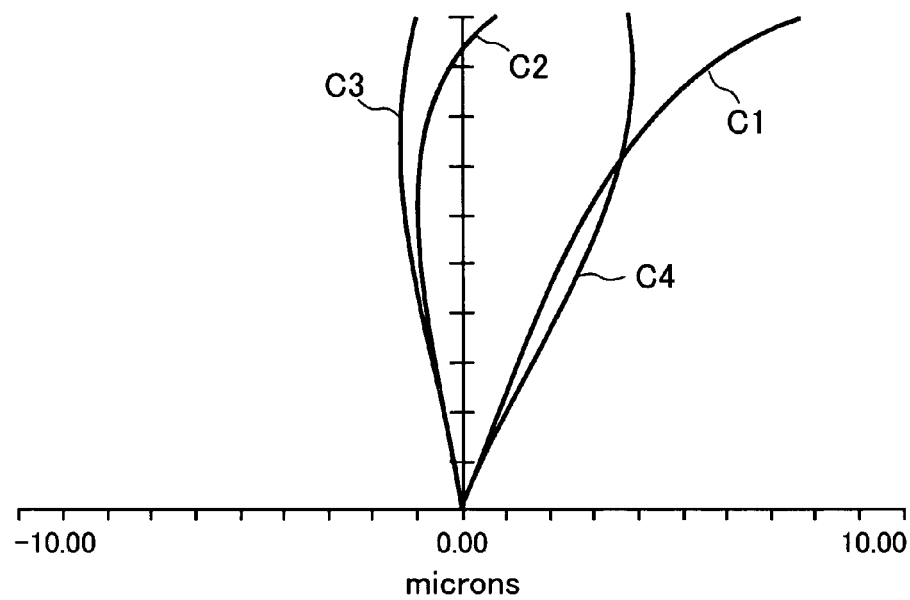
FIG. 24 illustrates the transverse chromatic aberration at the telephoto end of the fourth embodiment of the telecentric zoom lens.
Figure 25:
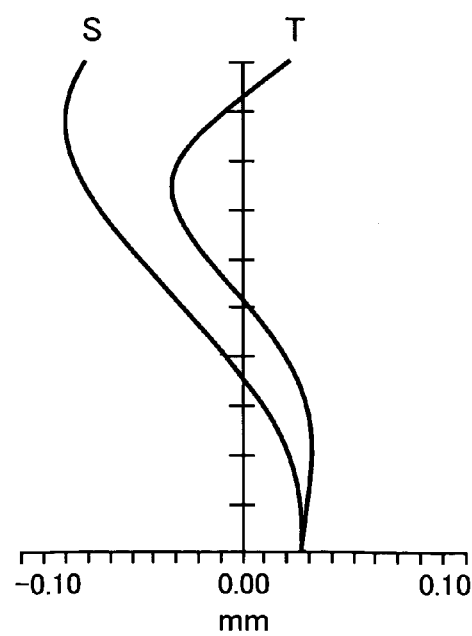
FIG. 25 illustrates the field curvature at the telephoto end of the fourth embodiment of the telecentric zoom lens.
Figure 26:
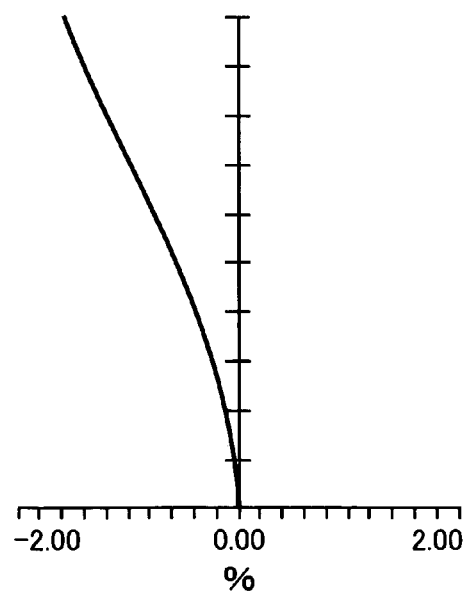
FIG. 26 illustrates the distortion aberration at the telephoto end of the fourth embodiment of the telecentric zoom lens.

FIG. 24 illustrates the traverse chromatic aberration of the fourth embodiment of the telecentric zoom lens at its telephoto end for various wavelengths 435.83 nm, 486.13 nm, 546.07 nm, and 656.27 nm in comparison with the reference wavelength 587.56 nm, as respectively designated by C1, C2, C3 and C4. FIG. 25 depicts the field curvature for the wavelength of 546 nm. FIG. 26 depicts the distortion aberration for the wavelength of 546 nm.

Figure 27:
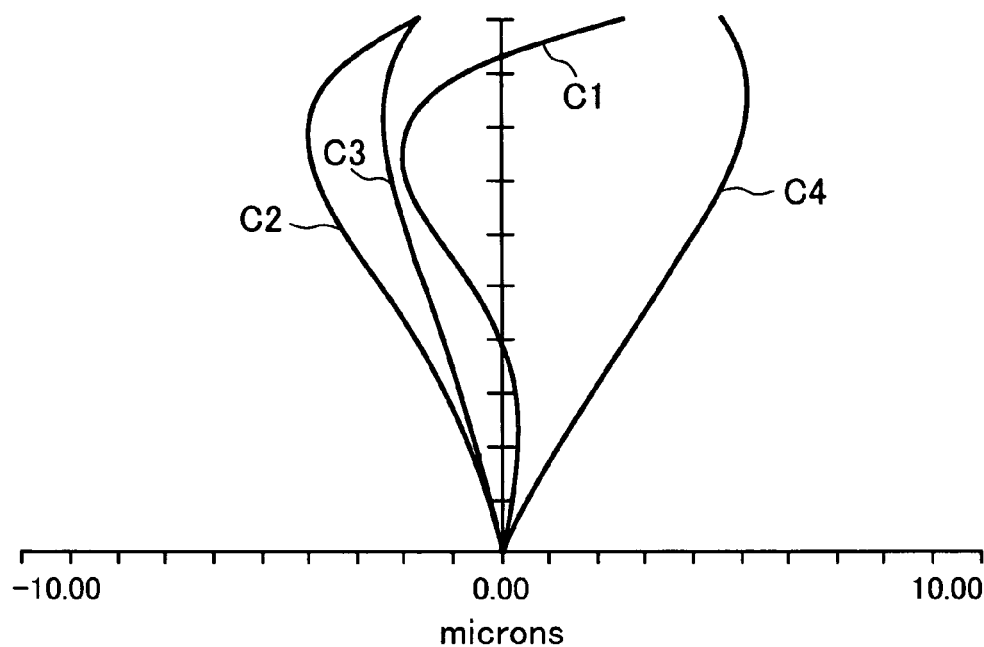
FIG. 27 illustrates the transverse chromatic aberration at the wide angle end of the fourth embodiment of the telecentric zoom lens.
Figure 28:
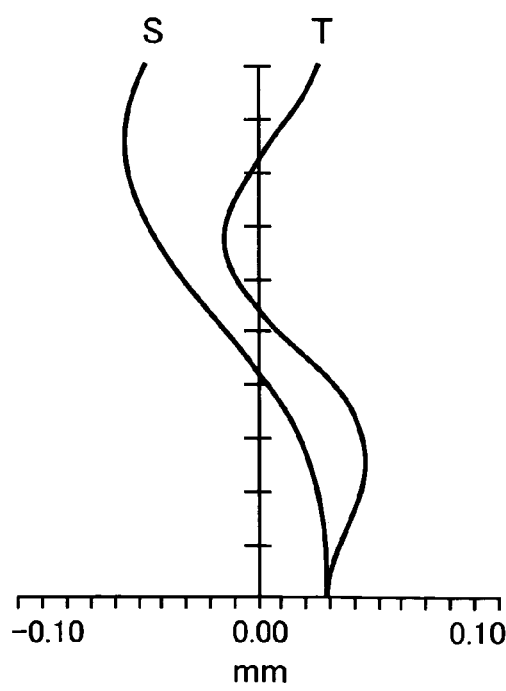
FIG. 28 illustrates the field curvature at the wide angle end of the fourth embodiment of the telecentric zoom lens.
Figure 29:
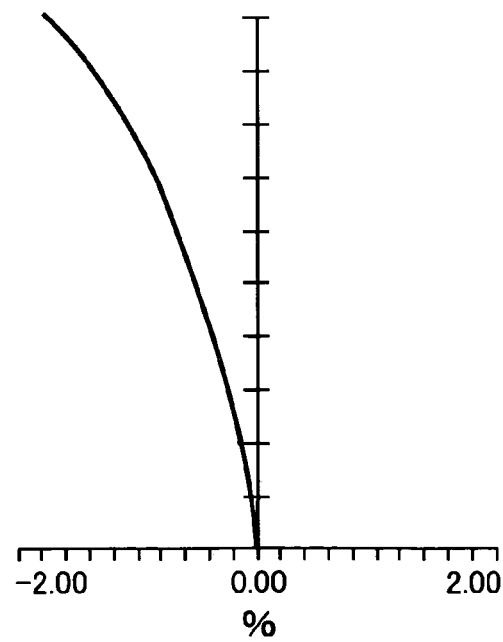
FIG. 29 illustrates the distortion aberration at the wide angle end of the fourth embodiment of the telecentric zoom lens.

FIG. 27 illustrates the traverse chromatic aberration of the third embodiment of the telecentric zoom lens at its wide angle end for various wavelengths 435.83 nm, 486.13 nm, 546.07 nm, and 656.27 nm in comparison with the reference wavelength 587.56 nm, as respectively designated by C1, C2, C3 and C4. FIG. 28 depicts the field curvature for the wavelength of 546 nm. FIG. 29 depicts the distortion aberration for the wavelength of 546 nm.

Embodiment 5

Figure 5:
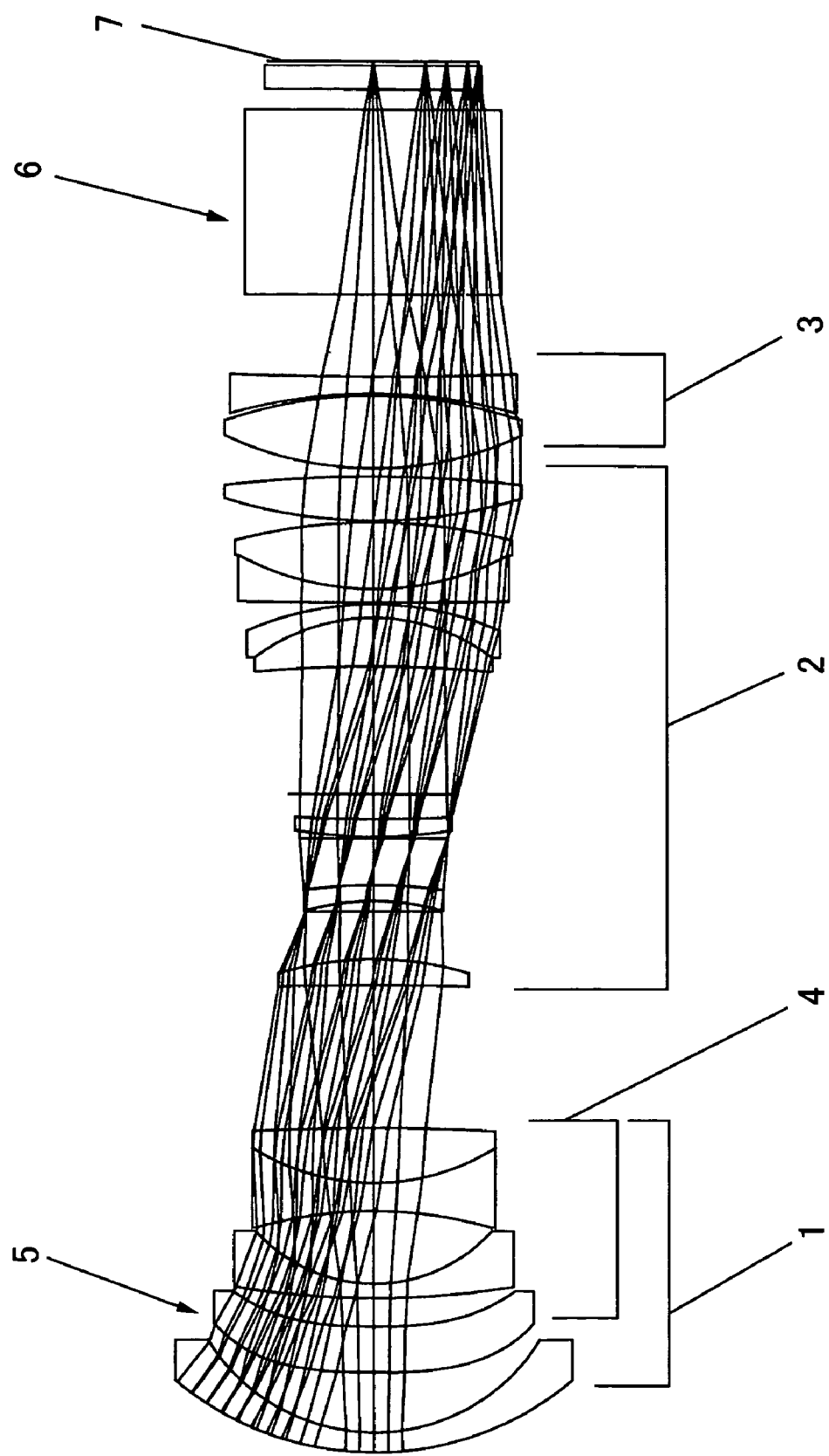
FIG. 5 depicts an optical structure of a fifth preferred embodiment of the telecentric zoom lens according to the present invention.

As shown in FIG. 5, a fifth preferred embodiment of the telecentric zoom lens is comprised of first to third groups of lenses, 1 to 3, and a prism 6, which are used in combination with a display panel 7.

Herein, the value of the term in each of the formulae (i) to (5) is given as follows:

|f1/fw| in the formula (1) is 1.91,
f2/fw in the formula (2) is 2.88,
f3/fw in the formula (3) is 8.74,
f11/f12 in the formula (4) is 1.32, and
|fp/fw| in the formula (5) is 28.5.

| Surface #<br>Object | Curvature<br>∞ | Lens Distance/Thickness<br>1900.000 | Refractive Index/<br>Dispersion |
|---|---|---|---|
| 1 | 37.868 | 2.500 | 1.85, 23.8 |
| 2 | 23.926 | 7.469 | |
| 3 (Aspherical) | 111.587 | 5.700 | 1.52, 56.3 |
| 4 (Aspherical) | 77.005 | 3.571 | |
| 5 | 104.371 | 1.800 | 1.49, 70.4 |
| 6 | 19.369 | 9.084 | |
| 7 | −51.288 | 3.500 | 1.50, 81.6 |
| 8 | 27.721 | 6.847 | 1.81, 40.7 |
| 9 | −299.480 | 17.848 | |
| 10 | −434.041 | 3.257 | 1.70, 55.5 |
| 11 | −39.917 | 5.963 | |
| Diaphragm | ∞ | 1.300 | |
| 13 | −29.638 | 2.000 | 1.72, 29.5 |
| 14 | −59.199 | 5.813 | |
| 15 | ∞ | 0.200 | |

-continued

| 16 | 56.924 | 2.238 | 1.81, 25.5 |
|---|---|---|---|
| 17 | 183.560 | 3.138 | |
| 18 | ∞ | 15.934 | |
| 19 | −156.026 | 6.069 | 1.49, 70.4 |
| 20 | −24.061 | 1.700 | 1.79, 43.9 |
| 21 | −38.208 | 0.200 | |
| 22 | 849.412 | 1.700 | 1.83, 37.3 |
| 23 | 34.773 | 8.321 | 1.50, 81.6 |
| 24 | −66.091 | 0.200 | |
| 25 | 61.456 | 5.518 | 1.50, 81.6 |
| 26 | −155.961 | 1.000 | |
| 27 | 42.685 | 9.093 | 1.50, 81.6 |
| 28 | −55.214 | 0.200 | |
| 29 | −65.524 | 2.130 | 1.83, 37.3 |
| 30 | 454.545 | 10.205 | |

<Aspherizing Ratio>

The 3rd Surface:

$\epsilon$ = 0.852312
A4 = $3.399606 \times 10^{-05}$
A6 = $-4.20730 \times 10^{-08}$
A8 = $9.389654 \times 10^{-10}$
A10 = $-5.37853 \times 10^{-14}$
A12 = 0.000000

The 4th Surface:

$\epsilon$ = 2.584363
A4 = $3.631926 \times 10^{-05}$
A6 = $-6.59697 \times 10^{-08}$
A8 = $1.889133 \times 10^{-10}$
A10 = $-2.85721 \times 10^{-13}$
A12 = 0.000000

Figure 30:
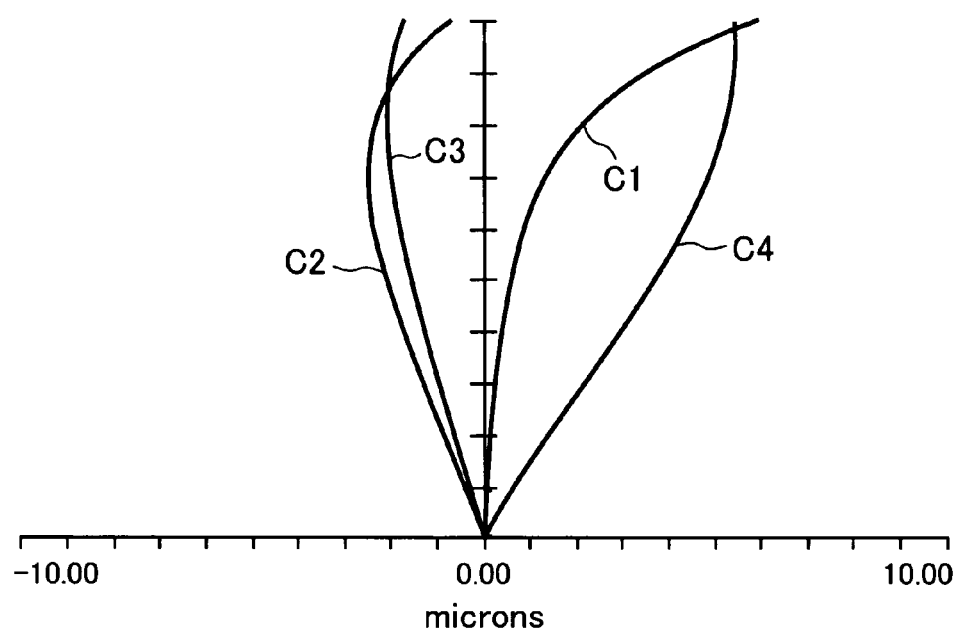
FIG. 30 illustrates the transverse chromatic aberration at the telephoto end of the fifth embodiment of the telecentric zoom lens.
Figure 31:
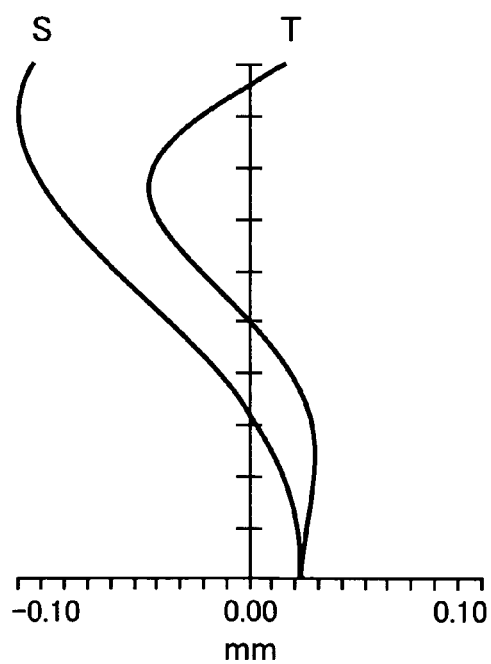
FIG. 31 illustrates the field curvature at the telephoto end of the fifth embodiment of the telecentric zoom lens.
Figure 32:
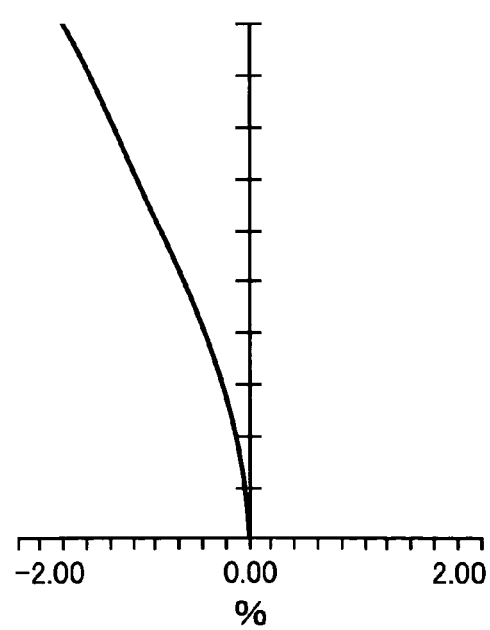
FIG. 32 illustrates the distortion aberration at the telephoto end of the fifth embodiment of the telecentric zoom lens.

FIG. 30 illustrates the traverse chromatic aberration of the fifth embodiment of the telecentric zoom lens at its telephoto end for various wavelengths 435.83 nm, 486.13 nm, 546.07 nm, and 656.27 nm in comparison with the reference wavelength 587.56 nm, as respectively designated by C1, C2, C3 and C4. FIG. 31 depicts the field curvature for the wavelength of 546 nm. FIG. 32 depicts the distortion aberration for the wavelength of 546 nm.

Figure 33:
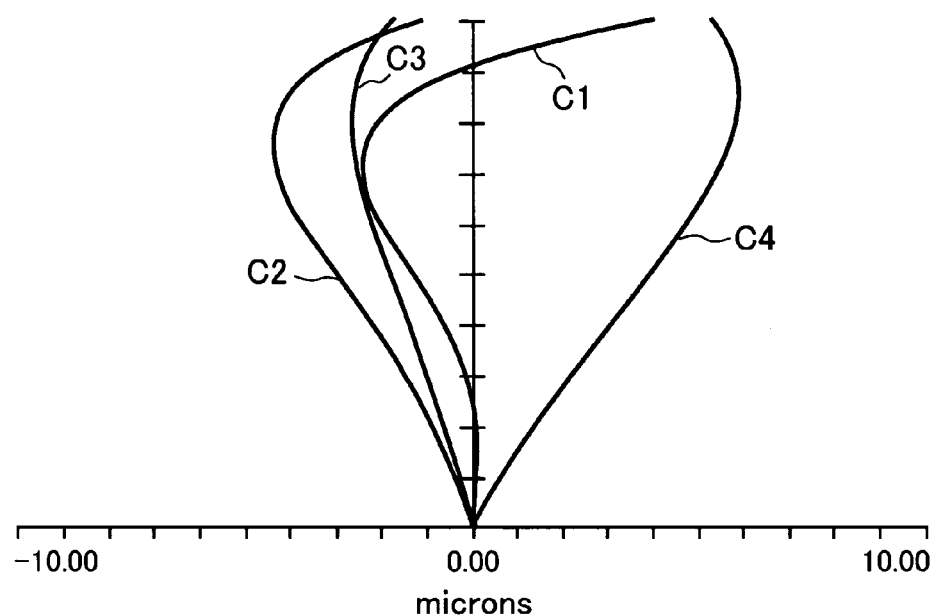
FIG. 33 illustrates the transverse chromatic aberration at the wide angle end of the fifth embodiment of the telecentric zoom lens.
Figure 34:
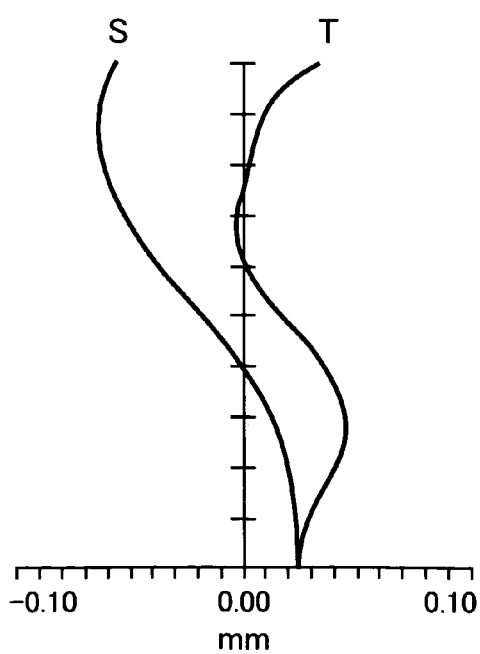
FIG. 34 illustrates the field curvature at the wide angle end of the fifth embodiment of the telecentric zoom lens.
Figure 35:
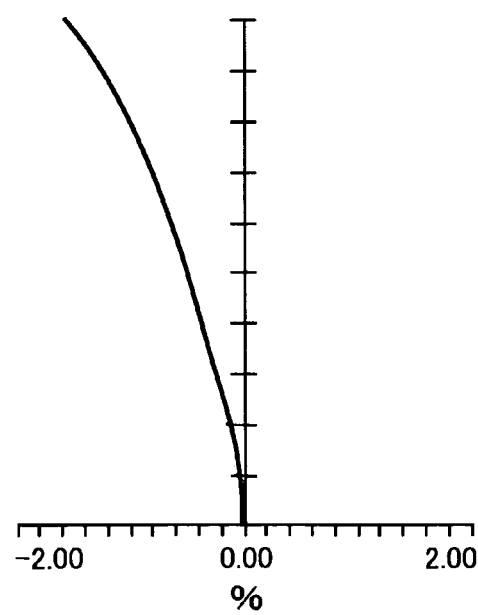
FIG. 35 illustrates the distortion aberration at the wide angle end of the fifth embodiment of the telecentric zoom lens.

FIG. 33 illustrates the traverse chromatic aberration of the fifth embodiment of the telecentric zoom lens at its wide angle end for various wavelengths 435.83 nm, 486.13 nm, 546.07 nm, and 656.27 nm in comparison with the reference wavelength 587.56 nm, as respectively designated by C1, C2, C3 and C4. FIG. 34 depicts the field curvature for the wavelength of 546 nm. FIG. 35 depicts the distortion aberration for the wavelength of 546 nm.

As has been described, the telecentric zoom lens according to the present invention is advantageous in that it attains the desired brightness (i.e., small numeral aperture), wide angle of view, reduced distortion, high resolution, reduced chromatic aberration, and reduced aperture, and that it can avoid a cost increase.

In the telecentric zoom lens according to the present invention, an imaging ability relative to the varied distance to the screen is unified, and the minimum projection distance to the screen can be get shorter.

Also, in the telecentric zoom lens according to the present invention, the aspherical lens takes an increased area of the aspherical surface so as to fully compensate for the distortion, and it has a reduced variation in thickness from the center to the periphery so that a variation in the lens performance relative to the varied temperature is decreased when the aspherical lens is made of resin as it typically is.

What is claimed is:

1. A telecentric zoom lens comprised of a first group of lenses negative in power, a second group of lenses positive in power, and a third group of lenses positive in power;
a focal length fw at a wide angle of view being given in relation with focal lengths f1, f2 and f3 of the first, second and third groups of lenses respectively, as follows:

$2.5 \geq |f1/fw| \geq 1.5$, $4 \geq f2/fw \geq 2.5$, and $13 \geq f3/fw \geq 3$.

2. A telecentric zoom lens according to claim 1, wherein at least one lens in the first lens group is an aspherical lens.

3. A telecentric zoom lens according to claim 2, wherein the first lens group consists of a first foremost component lenses and a second component lenses; and focal lengths of the first and second component lenses, f11 and f12, are given as follows:

$1.6 \geq f11/f12 \geq 0.5$.

4. A telecentric zoom lens according to claim 3, wherein the first and second component lenses in the first lens group vary an interval between them during the focusing without changing the whole axial dimension of the lens system.

5. A telecentric zoom lens according to claim 2, wherein a focal length fp of the aspherical surface of the aspherical lens can be given by a formula as follows:

$|fp/fw| \geq 13$.

6. A telecentric zoom lens according to claim 1, wherein the first lens group consist of three or more negative lenses while the second lens group consist of three or more positive lenses, and a dispersion value of at least three of the negative and positive lenses can be given by a formula as follows:

Dispersion $\geq 75$.

7. A telecentric zoom lens according to claim 1, wherein the third lens group consist of positive and negative lenses, and the dispersion value of the positive lens can be given by the following formula:

Dispersion $\geq 75$.

8. A telecentric zoom lens comprised of a first group of lenses negative in power, a second group of lenses positive in power, and a third group of lenses positive in power;
the first lens group consisting of a first negative meniscus lens having its convex surface oriented toward the screen, a second aspherical lens, a third negative meniscus lens having its convex surface oriented toward the screen, a fourth lens having its opposite surfaces shaped in concave, and a fifth positive lens having its opposite surfaces shaped in convex in the order of closer-to-the-screen-first;
the second lens group consisting of sixth and seventh positive lenses, an eighth negative lens, a ninth positive meniscus lens having its concave surface oriented toward the screen, a tenth negative meniscus lens having its concave surface oriented toward the screen and joined to the ninth lens, an eleventh concave lens, a twelfth lens having its opposite surfaces shaped in convex and joined to the eleventh lens, and a thirteenth lens having its opposite surfaces shaped in convex in the order of closer-to-the-screen-first; and
the third lens group consisting of a fourteenth positive lens having its opposite surfaces shaped in convex, and a fifteenth negative lens in the order of closer-to-the-screen-first; and a prism being located behind the third lens group.

9. A telecentric zoom lens according to claim 8, the first lens group consists of the first component lenses comprising a first negative meniscus lens and the second component lenses comprising the second aspherical lens, the third negative meniscus lens, the fourth lens and the fifth positive lens; and the first and second component lenses in the first lens group vary an interval between them during the focusing without changing the whole axial dimension of the lens system.

* * * * *